United States Patent
Eden (10) Patent No.: US 9,645,034 B2
(45) Date of Patent: May 9, 2017

(54) METHOD FOR OPERATING A WIND POWER PLANT

(75) Inventor: Georg Eden, Westerholt (DE)

(73) Assignee: WODDEN PROPERTIES GMBH, Aurich (DE)

( * ) Notice: Subject to any disclaimer, the term of this patent is extended or adjusted under 35 U.S.C. 154(b) by 478 days.

(21) Appl. No.: 13/989,345

(22) PCT Filed: Nov. 25, 2011

(86) PCT No.: PCT/EP2011/071030
§ 371 (c)(1),
(2), (4) Date: Aug. 2, 2013

(87) PCT Pub. No.: WO2012/069631
PCT Pub. Date: May 31, 2012

(65) Prior Publication Data
US 2013/0298634 A1    Nov. 14, 2013

(30) Foreign Application Priority Data
Nov. 25, 2010    (DE) .................. 10 2010 052 565

(51) Int. Cl.
*G01L 25/00*    (2006.01)
*F03D 17/00*    (2016.01)

(52) U.S. Cl.
CPC .............. *G01L 25/00* (2013.01); *F03D 17/00* (2016.05); *F05B 2270/802* (2013.01)

(58) Field of Classification Search
CPC ..... F05B 2270/802; G01L 25/00; F03D 17/00
USPC ....................... 73/1.15, 1.14, 1.13
See application file for complete search history.

(56) References Cited

U.S. PATENT DOCUMENTS

| 4,297,076 A | 10/1981 | Donham et al. |
| 2004/0057828 A1 | 3/2004 | Bosche |
| 2004/0108732 A1* | 6/2004 | Weitkamp ............... F03D 7/042 290/55 |
| 2005/0242233 A1* | 11/2005 | Battisti ............... F03D 11/0025 244/58 |
| 2009/0263246 A1* | 10/2009 | Bolz ..................... F03D 7/042 416/61 |

(Continued)

FOREIGN PATENT DOCUMENTS

| DE | 1 973 694 U | 11/1967 |
| DE | 10 2006 036 157 A1 | 2/2008 |

(Continued)

*Primary Examiner* — Michael A Lyons
*Assistant Examiner* — Suman K Nath
(74) *Attorney, Agent, or Firm* — Seed Intellectual Property Law Group LLP (57) ABSTRACT

The present invention concerns a method of operating a wind power installation, wherein the wind power installation has an aerodynamic rotor in the form of a horizontal-axis rotor having a hub with at least one rotor blade, and provided on the rotor is at least one load measuring means for detecting a wind loading on the rotor, the method includes the steps: rotating the rotor of the wind power installation without or with a slight wind loading for calibration of the load measuring means and in that case recording a load measurement with the load measuring means, and calibrating the load measuring means based on the load measurement and previously known weight forces occurring at the rotor.

17 Claims, 4 Drawing Sheets

(56) References Cited

U.S. PATENT DOCUMENTS

| | | | | |
|---|---|---|---|---|
| 2011/0058944 A1* | 3/2011 | Zuteck | ................. | F03D 7/0204 |
| | | | | 416/1 |
| 2011/0227342 A1* | 9/2011 | Danielsen | ............. | F03D 1/0658 |
| | | | | 290/44 |
| 2012/0292905 A1* | 11/2012 | Slot | ........................ | F03D 1/065 |
| | | | | 290/44 |

FOREIGN PATENT DOCUMENTS

| | | |
|---|---|---|
| EP | 0 995 904 A2 | 4/2000 |
| EP | 1 359 321 A1 | 11/2003 |
| EP | 2 112 375 A2 | 10/2009 |
| EP | 2 354 538 A1 | 8/2011 |
| WO | 01/33075 A1 | 5/2001 |

* cited by examiner

METHOD FOR OPERATING A WIND POWER PLANT

BACKGROUND

Technical Field

The present invention concerns a method of operating a wind power installation and a wind power installation.

Description of the Related Art

A wind power installation having a horizontal-axis rotor has at least one and usually three rotor blades which in ordinary operation rotate about a horizontal axis due to the wind incident thereon to generate electric energy by means of that rotary movement. If excessively strong wind is incident on the rotor blades the wind power installation can suffer damage—depending on the frequency or strength. Such loadings due to excessively strong wind can be countered, for example, by the rotor blades being at least partially turned out of the wind. That is also referred to as pitching.

To be able to initiate such measures or other measures for relieving the load on the wind power installation it is necessary to detect corresponding loadings due to strong wind. A continuously strong and uniform wind can be detected by the behavior of the wind power installation such as for example the resulting energy production. For short-term loadings or also for local loadings on for example only one rotor blade, sensors can be provided for measuring such a loading. Thus for example sensors such as strain gauges are used for detecting the flexing of each rotor blade. In that way a loading related to flexing of the rotor blade can be directly detected qualitatively and also quantitatively and correspondingly evaluated in order possibly also to take steps to limit the loading.

A prerequisite in that respect is that the corresponding loading sensors operate precisely and supply reliable values. For that purpose calibration and/or adjustment of the respective sensor is also quite essential. It is usual that sensors such as for example a strain gauge supply a strain-dependent resistance value or—depending on the respective electronic evaluation system connected downstream thereof—a strain-dependent signal such as for example an output signal. Those values are then to be associated with an associated loading on the rotor blade by means of calibration and adjustment.

Such calibration with adjustment can be very complicated and expensive and also liable to error because in that case associated loading values, which are to be recorded elsewhere, are to be associated with the measured sensor values. One possible way of effecting calibration with adjustment is pulling the blade manually with a comparative force which is to be measured so that calibration is effected on the basis of that comparative force. Thus for example a rotor blade in a 6:00 hours position can be pulled at its tip towards the pylon while the force applied is measured.

Added to that is the fact that relationships change in the course of operation of the wind power installation. That can be triggered by aging phenomena both of the rotor blades and also the sensors and also due to other reasons such as for example defects in the sensor or its fixing. If such changes are slight and/or occur slowly there is the danger that they remain unnoticed.

As state of the art attention is directed to DE 10 2006 036 157 A1.

BRIEF SUMMARY

Embodiments of the invention may simplify calibration and adjustment of at least one loading sensor and/or to increase as much as possible the reliability of such a calibration and/or adjustment. At least one embodiment of the invention seeks to propose an alternative solution.

According to one embodiment of the invention there is proposed a method. That method is based on a wind power installation having a horizontal-axis rotor. With such a horizontal-axis rotor, there is a substantially horizontal axis about which one or more rotor blades rotate, driven by the wind. That axis can also be in a slightly inclined position. The term of a wind power installation having a horizontal-axis rotor is familiar to the man skilled in the art as the classification of a given type of wind power installation, in particular to distinguish it from a wind power installation having a vertical axis.

Such a wind power installation has an aerodynamic rotor which has a hub having at least one rotor blade. Usually but not exclusively there are three rotor blades on a hub. Provided on the rotor is at least one load measuring means for detecting a wind loading on the rotor. Such a load measuring means can be arranged on the rotor blade or also on an adaptor for fixing the rotor blade to the rotor hub. These are preferred positions. It is however also possible to consider other positions such as for example directly on the hub. The location may depend on the specific structure of the rotor.

The wind power installation rotates the rotor without or with a low wind loading for the load measuring means. In that case a load measuring operation is implemented with the load measuring means. Ideally there is no wind loading involved. Nonetheless slight wind loadings can be disregarded or can possibly be taken into consideration by a computing procedure. Ultimately that also depends on the desired quality and accuracy.

Based on that load measurement and additionally based on previously known weight forces occurring at the rotor, calibration of the load measuring means is then effected.

Here the underlying realization is that, in the case of a horizontal-axis rotor, the weight of the rotor blades and correspondingly occurring weight forces can lead to a loading which the load measuring means detects. In particular it can be assumed that a vertically disposed rotor blade—that is to say which is in the 6 o'clock or 12 o'clock position—experiences practically no loading due to a weight force whereas the loading due to the weight forces when the rotor blade is in the horizontal position—that is to say in the 3 o'clock or 9 o'clock position—may be at the maximum. Thus zero passages can be detected and associated on the basis of the load measurement operation. The weight loading of a rotor blade is usually known and quantitative association can thus also be effected.

Preferably the rotor is rotated through at least one revolution for adjustment thereof and in that case a load pattern is recorded together with the respective position of the rotor. The position of the rotor in the peripheral direction, that is to say its position of 0 to 360°, is in that case recorded in such a way that it can be associated with the load pattern. The load pattern therefore includes a continuous or quasi continuous recording of the loading so that for example a loading value is recorded for each degree of angle in the rotary movement of the rotor. That is only an example and it is also possible to record more or fewer values, for example 200 increments. In particular with such a recording of a load pattern, if it is plotted in relation to the number of degrees of angle of the associated rotary position, an at least substantially sinusoidal pattern is to be expected. Deviations in relation thereto can occur depending on the respective non-linearities in the system.

Based on such a sinusoidal pattern configuration or also a pattern of a different configuration, it is now possible to effect an association, calibration and finally adjustment. As already stated the zero passages are to be assumed at 0° and 180°. And the maximum loading is to be expected according to the magnitude at 90° and 270°. Based thereon it is now possible to detect the deviations in relation to the pattern to be expected, which is referred to as calibration, and suitable correction values can be introduced, which is referred to as adjustment.

Explanations With Formula

It is advantageous inter alia that calibration and/or adjustment can be effected solely by substantially load-free rotation of the aerodynamic rotor. That calibration and/or adjustment can be applied to the wind-induced loading by virtue of the structural-engineering relationships.

Preferably adjustment is performed when bringing the wind power installation into operation and/or after a stoppage of the rotor and/or at the end of an operation for maintaining the wind power installation. If calibration or adjustment is also effected after a stoppage of the rotor, that is to say when the rotor re-starts, that makes it possible in particular to monitor and possibly adapt calibration and adjustment when the installation is brought into operation. Any changes in the load measuring means or other parameters in the course of time can thus be easily taken into consideration.

Wind power installations usually undergo maintenance procedures at regular intervals, which also usually make it necessary to stop the rotor. At the end of the maintenance operation the rotor is then re-started and thus, as a concluding activity of such a maintenance procedure, calibration and/or adjustment can thus be easily monitored and optionally corrected or renewed.

It is to be noted that calibration and/or adjustment according to the invention and as described hereinbefore can also be effected without the rotor having come to a halt. It should be noted however that the proposed load measurement is effected at any event without or at most with a slight wind loading.

It is desirable for rotation of the rotor for adjustment and/or calibration to be performed in an idle spinning mode. The term idle spinning mode is used to denote a mode of operation in which the aerodynamic rotor is rotated by in particular light wind, but without electric energy being generated and thus without an electric counteracting moment being built up, against which the aerodynamic rotor is rotated. In other words in that case the rotor rotates slowly in idle mode.

Preferably the at least one rotor blade is adjustable and in particular is turned out of the wind for performing the described load measurement procedure so that no or little energy is taken from the wind. In that way on the one hand an idle spinning mode can also be implemented with a medium or strong wind. If the load measuring means are so arranged that they are also adjusted upon adjustment of the rotor blade, the fact of the rotor blade being turned out of the wind also has the result that it is entirely or partially turned in a direction in which the load measuring means measure the weight force on the rotor blades at the location of a pressure loading due to the wind. In other words, with such an adjustment, the weight force acts in optimum fashion in precisely the direction in which the wind force acts on the rotor blade, if the rotor blade is not turned out of the wind. Accordingly, for load measurement for calibration and/or adjustment purposes, the influence of the wind, even if it occurs, can be minimized and the influence of the— known—weight force can be maximized and thus the load measurement can be carried out with a high degree of accuracy, having regard to previously known weight forces which occur at the rotor.

Preferably at least one strain gauge, in particular two or more strain gauges for each rotor blade, is used as the load measuring means. Thus a tried-and-tested measuring means can be used for detecting blade loadings and easily calibrated and/or adjusted. The use of a plurality of strain gauges makes it possible to take account of different loading directions and/or redundancy measurements can be afforded.

Preferably the at least one load measuring means is disposed at the hub, at a rotor blade root and/or at a blade adaptor. In particular use at the rotor blade root, that is to say at the portion of the rotor blade that is towards the hub, and also the arrangement on a blade adaptor, imply that, when using a rotatable rotor blade—that is to say in an installation with pitch control—the measuring means is also rotated and can thus be set to different loading directions. It is to be mentioned in that respect that the term blade adaptor is used to denote an adaptor arranged between the rotor blade and the hub, in particular between the rotor blade root and the hub. In other words, the rotor blade is fixed to the hub with its rotor blade root by means of the blade adaptor.

In addition according to the invention there is proposed a wind power installation adapted to carry out one or more of the above-described methods.

It is desirable to use results of the calibration operation, that is to say detecting any differences, for adjustment of the load means or for adjustment of an evaluation device connected thereto. Such an evaluation device can also be integrated in a process computer or a process computer can perform the corresponding evaluation.

If desirable embodiments of calibration and features related thereto are described they are basically also to be viewed as desirable in connection with an adjustment operation without that being expressly stated in each case.

Preferably a wind power installation has one or more of the features which was or were described hereinbefore in connection with the description of the method.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Figure 1:
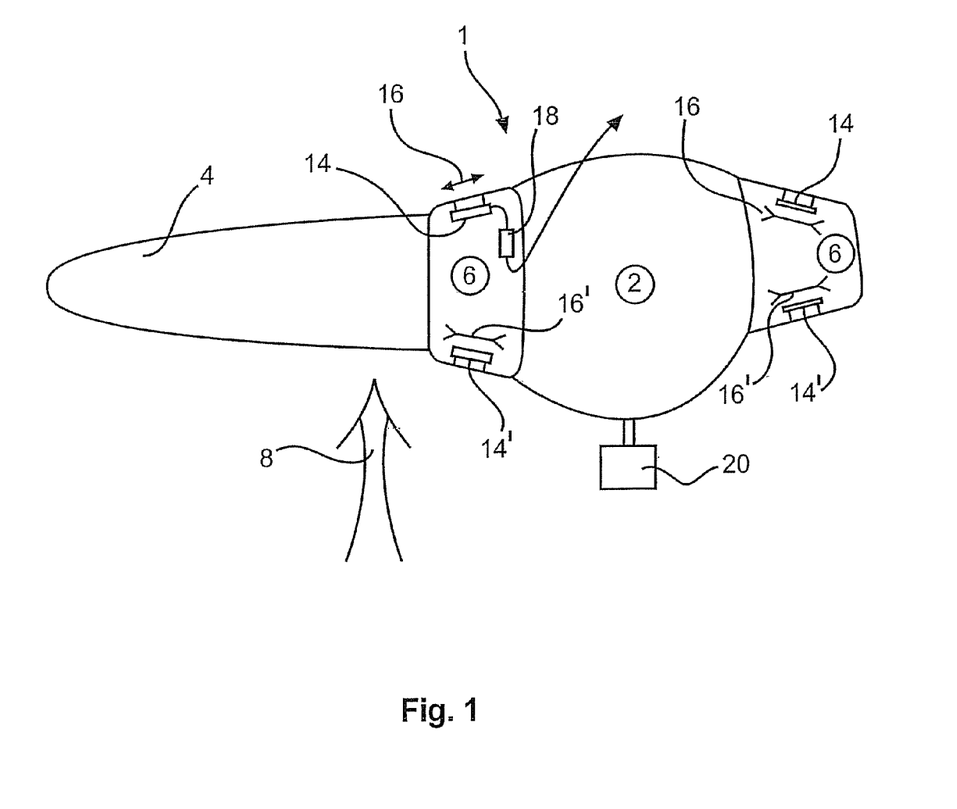
FIG. 1 is a diagrammatic plan view showing part of an aerodynamic rotor of a wind power installation.

The plan view in FIG. 1 shows a portion of a rotor 1 having a hub 2 and a rotor blade 4 out of a total of three rotor blades on the rotor 1. The rotor blade 4 is fixed to the hub by means of a blade adaptor 6. The blade adaptor 6 is fixed rotatably to the hub in order to turn the rotor blade 4 into the wind, out of the wind or into an intermediate position. A wind measuring means 20 for generally measuring the prevailing wind is shown in the region of the hub 2.

Figure 2:
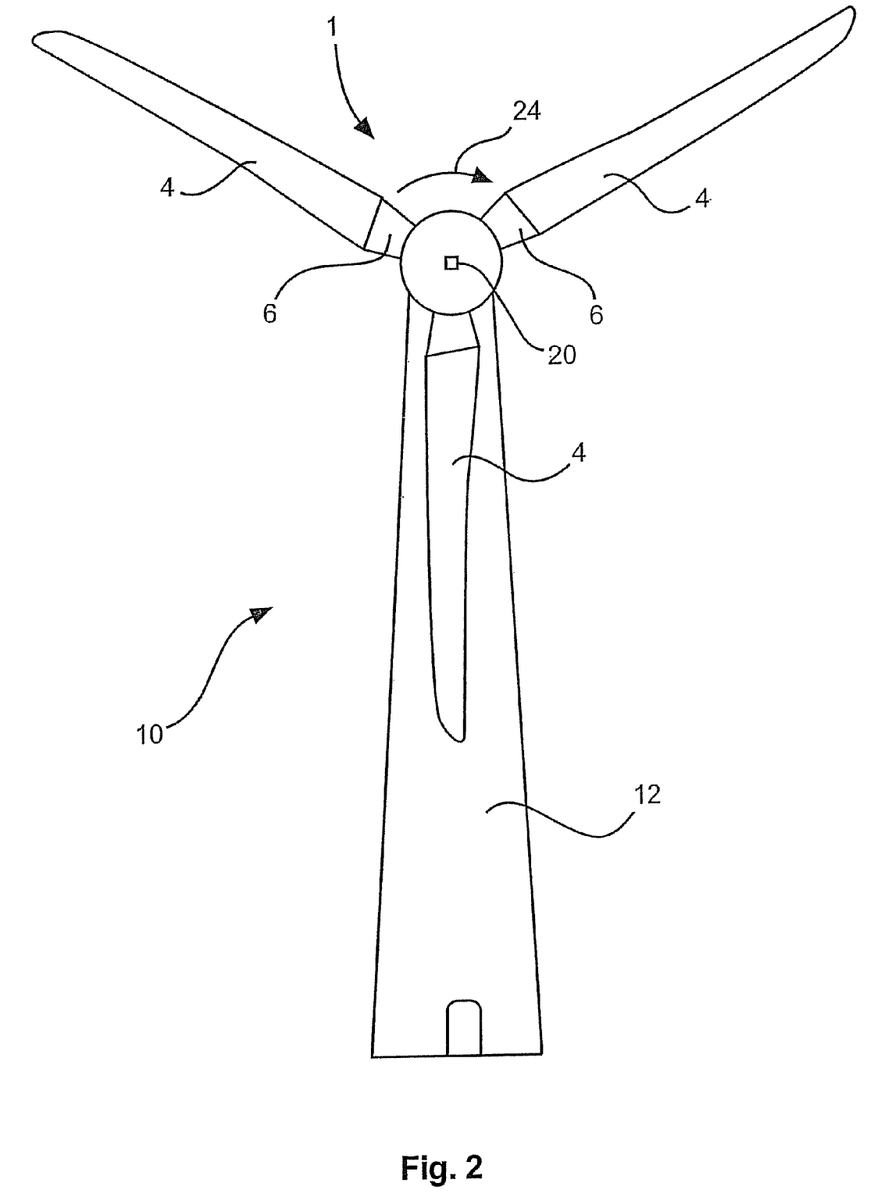
FIG. 2 is a diagrammatic front view of a wind power installation viewing in the direction of the wind when the wind power installation is directed in the correct fashion in relation to the wind, FIGS. 3a-c diagrammatically show a plan view of a wind power installation as shown in FIG. 2 but with an altered rotor blade position and with different pitch positions, and FIG. 4 diagrammatically shows a recorded load measurement for calibration and/or adjustment.

Reference 8 denotes an arrow specifying the direction of the wind which in usual operation acts on the rotor blade. In this case the wind direction corresponds to the direction of the view of a wind power installation as shown in FIG. 2. FIG. 2 diagrammatically shows an overall view of the wind power installation 10 and in that case illustrates the aerodynamic rotor 1 with three rotor blades 4. The wind power installation pylon 12 is also shown.

FIG. 1 thus shows a plan view of the wind power installation 10 of FIG. 2.

FIG. 1 also shows on the blade adaptor 6 a strain gauge 14 which functions as a load measuring means. A double-headed arrow illustrates load directions 16 which can be detected by means of the strain gauge 14. If a compression effect is measured with the strain gauge 14 in the load direction 16, stretching is detected with the strain gauge 14' for the load direction 16', if the same wind is assumed to occur. Strain gauges 14 and 14' can be arranged at each rotor blade 4 or blade adaptor 6. In other words the strain gauge can detect both stretching effects and also compression effects and thus loads on the rotor blade in positive and negative directions. Usually a value zero is associated with an unloaded condition of the rotor blade 4. In the case of a wind acting on the rotor blade 4 the rotor blade is loaded in the direction of the wind 8 and also yields somewhat in that direction of the load. That results in a compression effect in the region away from the wind and thus also stretching of the strain gauge 14 in the present view. That stretching can be evaluated by means of an evaluation unit 18 which is only diagrammatically shown here and further consideration of the results can follow. Depending on the respective configuration involved, it may be sufficient to provide only one strain gauge or other measuring sensor for each rotor blade.

Figure 3A:
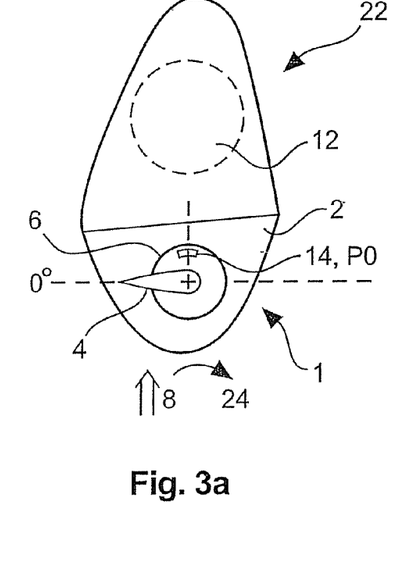
Figure 3B:
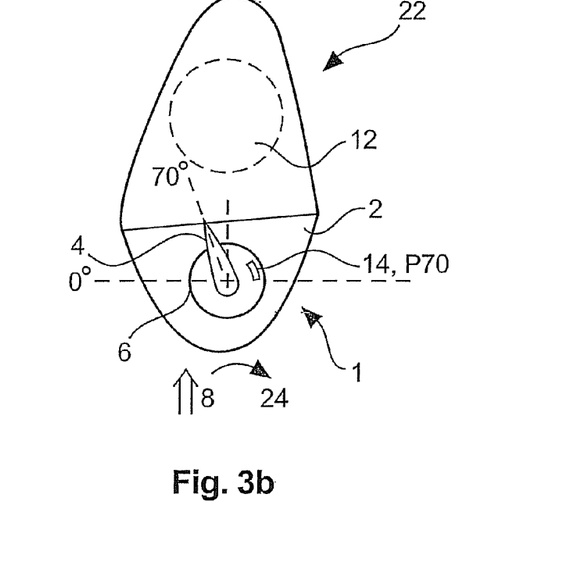
Figure 3C:
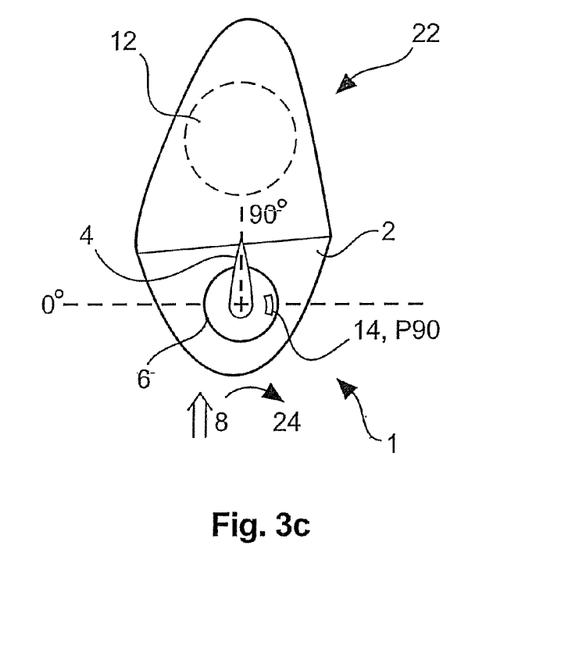

FIGS. 3a-c diagrammatically show a plan view of a wind power installation as shown in FIG. 2, but with an altered rotor blade position. In that respect FIGS. 3a-c show a pod 22 which is not shown in FIG. 1 for the sake of enhanced clarity. In addition the pylon 12 is indicated in FIGS. 3a-c for better understanding; it will be appreciated that, because of the selected plan view, the pylon 12 is concealed by the pod 22 and has been shown in broken line here only to make it easier to understand. At any event in regard to the illustrated casing which is also referred to as the spinner, a rotor blade 4 is shown in three so-called pitch positions, one position per Figure, on the hub 2 which can be considered as part of the pod 22. In this case the rotor 1 is in a position in which the illustrated rotor blade 4 projects perpendicularly upwardly. This therefore illustrates a so-called 12 o'clock position. The further rotor blades are not needed here for explanatory purposes and are therefore not shown. In this case FIG. 3a shows the one rotor blade 4 in an orientation relative to the wind with a pitch angle of 0° degrees. The first position at the pitch angle of 0° can also be referred to as the unpitched condition, depending on the respective way it is viewed. In this case the rotor blade 4 is turned into the wind 8 in such a way that maximum energy can be taken from the wind. With a correspondingly prevailing wind the hub 2 and therewith the rotor 4 overall rotates in the direction of rotation 24. The loading occurring on the rotor blade 4 due to the wind 8 can be detected by means of the strain gauge 14. With that pitch position of 0° the strain gauge 14 is in a position referred to as the P0 position. It is highly suited in that respect to detect the loading occurring on the rotor blade 4 due to the wind 8.

FIG. 3b shows the one rotor blade 4 in an orientation relative to the wind with a pitch angle of 70°. In that pitch position the rotor blade 4 offers scarcely any resistance to the wind 8 and the wind 8 can thus apply no or at most a slight loading to the rotor blade 4. It will be noted however that an idle spinning mode of operation of the wind power installation could occur. Due to the rotor blade 4 being turned into the 70° position, the strain gauge 14 is also turned into a position identified as P70. The strain gauge 14 can scarcely detect any loading on the rotor blade 4 due to the wind 8 in that P70 position, especially as in this case the wind can exert scarcely any load on the rotor blade 4. A pitch position of 90° is shown in FIG. 3c to complete the scenario.

Nonetheless in the illustrated P70 position of the strain gauge 14, it is possible to detect a moment due to the own weight of the rotor blade. In that respect that moment is not falsified, or not substantially falsified, by any wind load. It will be noted however that in the illustrated perpendicular position of the rotor blade, the weight force or moment due to weight at the sensor or strain gauge 14 is zero. If the rotor 1 rotates further in the direction of rotation 24 the weight force continuously increases until the rotor has further rotated through 90°. In that respect this means the rotor rotary movement 24 which is also shown in the front view in FIG. 2, and is not to be confused with the pitch adjustment which is shown in FIGS. 3a-c. When the rotor blade 4 in question projects horizontally, thus transversely with respect to the pylon 12, which is also referred to as the 3 o'clock position, the load is at a maximum. After a further 90° when the rotor blade 4 in question is hanging down virtually perpendicularly, as is shown for a rotor blade 4 in FIG. 2, the weight loading which can be detected by the strain gauge 14 is zero. Upon a further rotation in the direction of rotation 24 through 90° into the 9 o'clock position the load detected by the strain gauge 14 due to the force caused by the weight of the blade is at a maximum, but with a reversed sign, with respect to the 3 o'clock position.

Figure 4:
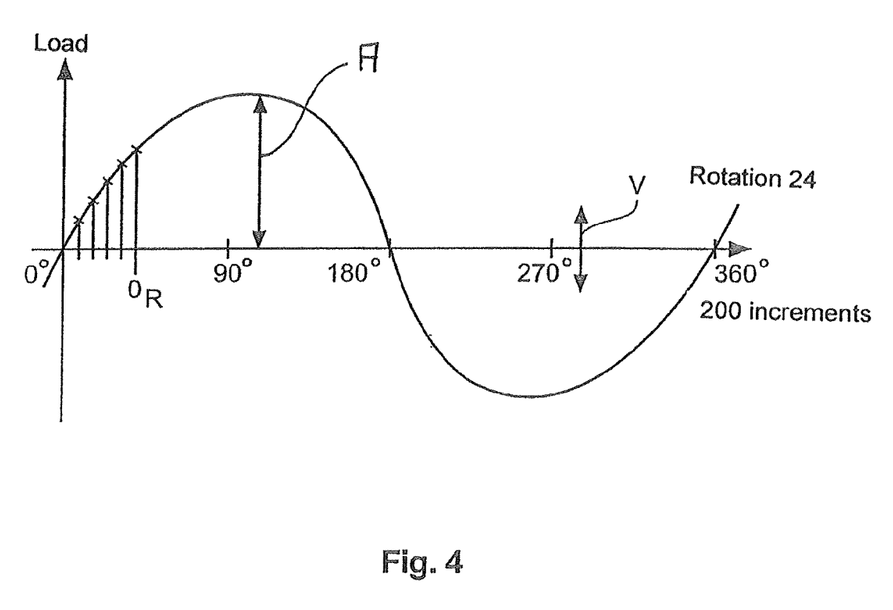

In a complete revolution of the rotor 1 the strain gauge 14 thus records a sinusoidal load curve which is shown in FIG. 4. At 0 and 360° which correspond to the 12 o'clock position and at 180° which corresponds to the 6 o'clock position the load is zero if the measuring means, namely the strain gauge 14, is correctly adjusted together with its evaluation unit. In the illustrated embodiment however the position of the rotor is also detected by means of an incremental sensor 20, which can be effected for example by dividing a revolution into 200 increments.

A possible way of implementing adjustment is for a measuring series of measurement values of the load measuring means to be recorded over at least one complete revolution. Thus for example 200 measurements Rn can be recorded for example a revolution with the load measuring means with n=0–199 at regular intervals. With a known weight or with a known weight loading A on the rotor blade in question the 200 measurement values Rn then give the following relationship:

$$A = k1 \sum_{n=0}^{199} \| R_n \|$$

The value A is recorded as amplitude in the graph in FIG. 4. The coefficient $k_1$ can thus be determined from the known value A and the measurements Rn. Any displacements relative to the zero line are averaged out by the absolute value formation in respect of the measurement values Rn of a revolution or a plurality of complete revolutions. In a second run or a second evaluation step the displacement V can be determined, which gives the displacement of the measurement curve relative to the zero line:

$$V = k2 \sum_{n=0}^{199} R_n$$

The coefficient $K_2$ can be ascertained by comparative measurements or can be determined from known relationships like the circuit amplification of the regulating system. The number of recorded measurement values is also involved in the coefficients $k_1$ and $k_2$.

This calculation therefore again involves sum formation but without previous absolute value formation, so that the displacement V can be determined. That displacement V is indicated in FIG. 4 by a corresponding double-headed arrow.

Thus sensitivity and the zero point of load measurement can be determined by slow idle spinning of the installation prior to the actual start. For that purpose the measurement values are recorded per revolution. They correspond to the blade weight. As the blade weight is known the sensitivity of the sensor, that is to say the load measuring means, in particular the strain gauge, can be calibrated. The zero point can also be determined on the basis of the values ascertained.

Thus, in an optimum fashion, manual adjustment is no longer required and drift of the measurement over a long period of time is automatically compensated. Automatic adjustment of load measurement at each start-up of the installation is thus possible. In particular the problem of a drift of offset and sensitivity of measurement in previously known methods is resolved, or at least addressed and reduced.

A rotor blade which is turned out of the wind, that is to say upon a great change in the pitch angle, provides that in that way at the same time the strain gauge 14 can be adapted to measurement of a load due to the force caused by the weight of the rotor blade 4. In other words the weight force acts in a different direction from the wind force, and that can be taken into consideration by changing the position of the load measuring means when turning the rotor blade 4 out of the wind. The position of the load measuring means is thus adapted to the respectively acting direction of force. Insofar as that directional adaptation is not effected completely because for example when changing the pitch of the rotor blade the rotor blade is altered only through 70° but not through 90°, that can be taken into account by computation on the basis of the geometrical relationships, especially as the respectively set pitch angle is usually available to the evaluation unit of the load measuring means or can be made available.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind power installation that has an aerodynamic rotor that is a horizontal-axis rotor having a hub with at least one rotor blade, and provided on the rotor is at least one load measuring means for detecting a loading on the rotor, the method comprising:
orientating the rotor of the wind power installation with a slight or no wind loading;
rotating the rotor through a single complete revolution of the rotor;
recording a series of load measurements with the at least one load measuring means at regular intervals of the single complete revolution of the rotor, the series of load measurements including a first set of compression loads and a second set of stretching loads;
totaling the absolute values of the series of load measurements; and
calibrating the load measuring means, wherein calibrating comprises determining a sensitivity of the load measuring means based on the total of the absolute values of the series of the load measurements and previously known weight forces occurring on the rotor.

2. The method according to claim 1 further comprising adjusting initial values of the load measuring means based on the calibration.

3. The method according to claim 1 wherein rotating the rotor comprises rotating the rotor through a subsequent revolution, and wherein recording the series of load measurements comprises recording a load measurement and an orientation of the rotor at the regular intervals.

4. The method according to claim 1 wherein calibrating the load measuring means occurs when the wind power installation is operating, after stopping the rotor from rotating, or at the end of a maintenance operation on the wind power installation.

5. The method according to claim 1 wherein rotating the rotor is effected in an idle spinning mode.

6. The method according to claim 1 wherein the at least one rotor blade is adjustable and wherein the rotor blade is turned out of the wind so that no or little energy is taken from the wind.

7. The method according to claim 1 wherein the load measuring means includes at least one strain gauge.

8. The method according to claim 1 wherein the at least one load measuring means is arranged on at least one of the hub, a rotor blade root, and a blade adaptor for fixing the at least one rotor blade to the hub.

9. A wind power installation comprising:
an aerodynamic rotor having a horizontal-axis, the rotor including a hub and at least one rotor blade; and
at least one load measuring means arranged on the rotor for detecting a wind load on the rotor, wherein the wind power installation is adapted to rotate the rotor of the wind power installation without or at a slight wind loading for calibrating the load measuring means and recording load measurements at regular intervals with the load measuring means, wherein a total of the load measurements include a first set of compression loads and a second set of stretching loads, the wind power installation being further adapted to calibrate the load measuring means based on the load measurement and previously known weight forces occurring at the rotor, wherein using the load measurement means over a single complete revolution of the rotor, measurement values are recorded and totaled, and a sensitivity of the load measurement means is determined from one of the known weight forces and the totaled values of the measurement values.

10. The wind power installation according to claim 9 wherein the at least one load measuring means includes at least one strain gauge for each rotor blade.

11. The wind power installation according to claim 9 wherein the at least one load measuring means is arranged on at least one of the hub, a rotor blade root, and a blade adaptor for fixing the at least one rotor blade to the hub.

12. The wind power installation according to claim 9 wherein the at least one load measuring means includes a plurality of strain gauges located on at least one of the hub and the rotor blade of the rotor.

13. A method of calibrating a load measuring device on a rotor of a wind power installation, the method comprising:
   rotating the rotor of the wind power installation so that a slight or no wind is applied to a rotor blade of the rotor such that the wind power installation is not generating electric power;
   for various regular positions of the rotor as the rotor rotates a single complete rotation:
      measuring a respective load on the rotor using the load measuring device;
      recording the respective measured load, the measured load being either a compression load or a stretching load, wherein all of the measured loads being measured at the various regular positions of the rotor include both compression loads and stretching loads;
   totaling absolute values of the recorded loads; and
   calibrating the load measuring device based on the totaled absolute values of the recorded loads.

14. The method according to claim 13 wherein rotating the rotor comprises rotating the rotor through at least one revolution, and further comprising measuring a plurality of loads at a plurality of locations through the at least one revolution.

15. The method according to claim 14 wherein the load measuring device includes at least two strain gauges.

16. The method according to claim 1 further comprising:
   rotating the rotor through another complete revolution and recording a subsequent series of load measurements; and
   determining a displacement of the subsequent series of load measurements with respect to a zero line.

17. The wind power installation according to claim 9 wherein in a subsequent passage, a subsequent series of measurements is recorded and totaled and a displacement of the measurement series with respect to a zero line is determined.

* * * * *

UNITED STATES PATENT AND TRADEMARK OFFICE
CERTIFICATE OF CORRECTION

PATENT NO. : 9,645,034 B2  
APPLICATION NO. : 13/989345  
DATED : May 9, 2017  
INVENTOR(S) : Georg Eden

Page 1 of 1

It is certified that error appears in the above-identified patent and that said Letters Patent is hereby corrected as shown below:

On the Title Page

Item [73], "WODDEN PROPERTIES GMBH, Aurich (DE)" should read, --WOBBEN PROPERTIES GMBH, Aurich (DE)--.

Signed and Sealed this  
Twenty-second Day of May, 2018

Andrei Iancu  
*Director of the United States Patent and Trademark Office*